(12) United States Patent
Cunchon et al.

(10) Patent No.: US 8,073,949 B2
(45) Date of Patent: Dec. 6, 2011

(54) SECURE MULTIAPPLICATION PROXY

(76) Inventors: François Cunchon, Ledoux (FR); Rene Martin, Bures sur Yvette (FR); Van-Dung N'Guyen, Limeil Brevannes (FR)

( * ) Notice: Subject to any disclaimer, the term of this patent is extended or adjusted under 35 U.S.C. 154(b) by 914 days.

(21) Appl. No.: 09/936,286

(22) PCT Filed: Jan. 24, 2001

(86) PCT No.: PCT/FR01/00224
§ 371 (c)(1),
(2), (4) Date: Sep. 12, 2001

(87) PCT Pub. No.: WO01/56247
PCT Pub. Date: Aug. 2, 2001

(65) Prior Publication Data
US 2002/0162024 A1   Oct. 31, 2002

(30) Foreign Application Priority Data
Jan. 27, 2000 (FR) ..................... 00 01054

(51) Int. Cl.
G06F 15/173 (2006.01)

(52) U.S. Cl. .......... 709/225; 709/228; 709/229; 726/12; 726/14

(58) Field of Classification Search ............ 709/224, 709/223, 225, 229; 713/200, 201; 726/12, 726/13, 14
See application file for complete search history.

(56) References Cited

U.S. PATENT DOCUMENTS

| | | | | |
|---|---|---|---|---|
| 5,623,601 A * | 4/1997 | Vu | .................................. | 726/12 |
| 5,699,513 A * | 12/1997 | Feigen et al. | .................... | 726/11 |
| 5,805,803 A * | 9/1998 | Birrell et al. | .................... | 726/12 |
| 5,828,832 A | 10/1998 | Snow et al. | | |
| 5,845,068 A * | 12/1998 | Winiger | ........................ | 713/200 |
| 5,898,830 A * | 4/1999 | Wesinger et al. | ............. | 713/201 |
| 5,903,732 A * | 5/1999 | Reed et al. | ..................... | 709/229 |
| 5,940,591 A | 8/1999 | Boyle et al. | | |
| 5,968,176 A * | 10/1999 | Nessett et al. | ................. | 713/201 |
| 5,983,350 A * | 11/1999 | Minear et al. | ................. | 713/201 |
| 6,003,084 A * | 12/1999 | Green et al. | .................. | 709/227 |
| 6,081,900 A * | 6/2000 | Subramaniam et al. | ........ | 726/19 |
| 6,092,191 A * | 7/2000 | Shimbo et al. | ................ | 713/153 |
| 6,134,591 A * | 10/2000 | Nickles | ......................... | 709/229 |
| 6,473,406 B1 * | 10/2002 | Coile et al. | .................... | 370/248 |
| 6,510,464 B1 * | 1/2003 | Grantges et al. | ............. | 709/225 |
| 6,584,567 B1 * | 6/2003 | Bellwood et al. | ............. | 713/171 |
| 6,643,701 B1 * | 11/2003 | Aziz et al. | ...................... | 709/227 |
| 6,678,827 B1 * | 1/2004 | Rothermel et al. | ........... | 709/229 |

(Continued)

FOREIGN PATENT DOCUMENTS

EP   0 849 680 A   6/1998

*Primary Examiner* — Kevin Bates
(74) *Attorney, Agent, or Firm* — Russell W. Guenthner

(57) ABSTRACT

A client application (16) establishes in a client network (10), a first connection having a first security level, directly with a first port (1) of a server application (17) hosted in a server machine (13) linked to a server network (11), in order to send messages addressed to the server machine (13). The messages pass from the client network (10) to the server network (11) through a network layer (CR) of a gateway machine (9). In the gateway machine, a secure application proxy reroutes the messages from the first connection, in a way that is transparent for the client application, and establishes a second connection having a second security level with the server application; the second connection is unknown to the client application.

6 Claims, 5 Drawing Sheets

U.S. PATENT DOCUMENTS

| | | | |
|---|---|---|---|
| 6,751,677 B1 * | 6/2004 | Ilnicki et al. | 709/229 |
| 6,779,111 B1 * | 8/2004 | Gehrmann et al. | 713/171 |
| 6,785,281 B1 * | 8/2004 | Kanemaki et al. | 370/395.1 |
| 6,981,265 B1 * | 12/2005 | Rees et al. | 719/313 |
| 7,249,377 B1 * | 7/2007 | Lita et al. | 726/12 |
| 7,430,757 B1 * | 9/2008 | Chari et al. | 726/4 |
| 7,757,278 B2 * | 7/2010 | Boneh et al. | 726/12 |
| 2003/0167403 A1 * | 9/2003 | McCurley et al. | 713/201 |

* cited by examiner

SECURE MULTIAPPLICATION PROXY

FIELD OF THE INVENTION

The field of the invention is that of computer networks. The increasing expansion of these networks allows users to exchange email nearly worldwide, to interrogate databases or to run computer equipment remotely.

DESCRIPTION OF RELATED ART

To do this, a user has in his machine a client application, for example an electronic messaging service for sending and receiving mail, a browser, such as an http: browser for accessing Web pages on the Internet, or a Telnet application that plays the role of a remote terminal. A client application of this type establishes a connection via computer networks with a server application hosted in a remote machine. For email, the role of the server application is to receive messages sent by client applications and make them available in a mailbox that destination client applications can consult. For dialogues with Web pages, the role of the server application is to present the pages of a site, while possibly collecting data received in specific fields on a page. In order to be run remotely, a piece of computer equipment hosts a server application, such as for example telnetd, which has access locally to the functions of the computer equipment.

The user-friendly establishment of these connections in public networks like the Internet facilitates, among other things, the development of electronic commerce. A client application such as http: makes it possible, for example, to consult a vendor catalogue on a site made available by a server application of this vendor, then to place an order online for an item of interest to the user of the client application. While the connection established for the online consultation of a public catalogue does not pose any confidentiality problems, the same cannot be said of the connection established at the time of an online payment for the order.

In order to maintain confidentiality in a data transfer via public computer networks, a server application has a specific port that makes it possible to establish a secure connection with the client application. The client application requests the secure connection by invoking, for example, the known https: protocol in the case of dialogues with web pages. In a secure connection, the messages exchanged between the client application and the server application are encrypted by the sending application and decrypted by the receiving application.

However, the encryption and decryption operations are computation-intensive. When a lot of secure connections various client applications are established in a server application, the load in terms of computing resources imposed by the encryption and decryption operations runs the risk of seriously reducing the performance of the server application.

Generally, a server application is hosted in a server machine linked to a private server network to which other server machines hosting other server applications of the same entity are also linked. Establishing a secure connection requires numerous exchanges of preliminary messages in order to exchange identification and cryptographic certificates, exchange private keys, and authenticate with certainty each of the applications to be sent through the secure connection. These message exchanges, which are peripheral to the message exchanges that are actually involved in a secure transaction between the server application and the client application, cause congestion in the private network, thus running the risk of reducing its performance.

The problems mentioned above for a server machine linked to a private server network, can also occur for a client machine linked to a private client network.

SUMMARY OF THE INVENTION

In order to eliminate the above-mentioned drawbacks, a first subject of the invention is a method allowing a client application to establish in a client network a first connection having a first security level, directly with a first port of a server application hosted in a server machine linked to a server network, in order to send messages addressed to the server machine, said messages passing from the client network to the server network through a network layer of a gateway machine, characterized in that it comprises:
  a first step that creates a second port in the gateway machine;
  a second step that orders the network layer of the gateway machine to reroute to the second port any message sent to the first port, addressed to the server machine;
  a third step that listens to the second port;
  a fourth step that generates in the gateway machine a thread for establishing said first connection, when the third step detects in the second port a request to establish said first connection.

Thus, when the private network is the server network, the messages of the secure connection coming from the public network via the first connection are processed in the gateway machine in order to be transmitted to the private network, which in this case constitutes the server network, with a lower, or even a zero security level, which relieves congestion in the server network and the server application. The security operations are remoted from the server machine to the gateway machine provided especially for this purpose.

When the private network is the client network, the messages of the low-security or zero-security connection coming from the private network via the first connection are processed in the gateway machine in order to be transmitted to the public network, which in this case constitutes the server network, with a higher security level, while avoiding overloading the client network and the client application. The security operations are remoted from the client machine to the gateway machine provided especially for this purpose.

A particular advantage of the method according to the invention is that the second step makes the processing by the gateway machine transparent to the client application. This means that the client application, having no knowledge of the processing in the gateway machine, establishes a direct connection with the server machine that hosts the server application.

In order to automatically implement the process in the gateway machine, a secure application relay, or secure application proxy, generates various processes that execute the steps of the method.

This allows the secure proxy to play the role of the server application in the client network. The number of the first port and the network address of the server machine distinguishes the server application from other server applications that may be listening in the server network. In the presence of several server applications listening in the server network, the third port, specific to each server application, allows the secure proxy to be a multiapplication proxy, in that it plays the role of each server application for which the dynamically generated third port is distinct.

The means used by the secure proxy are activated in combination, by one or more processes executed by an operating system of the gateway machine.

Advantageously, the secure proxy is characterized in that:
- a configuration request by a user creates a father process that activates the first two steps;
- the father process generates a second process that specifically activates the subsequent steps;
- upon each opening of a connection to the first port, the second process generates a thread that disappears when said connection is closed.

Each thread uses all of the memory of the second process. Thus, the opening of a new connection intended for the first port can use data from a previous connection intended for the first port, stored in the second process.

BRIEF DESCRIPTION OF THE DRAWINGS

An exemplary embodiment of the invention is explained in the following description in reference to the figures, in which.

DESCRIPTION OF THE PREFERRED EMBODIMENT(S)

Figure 1:
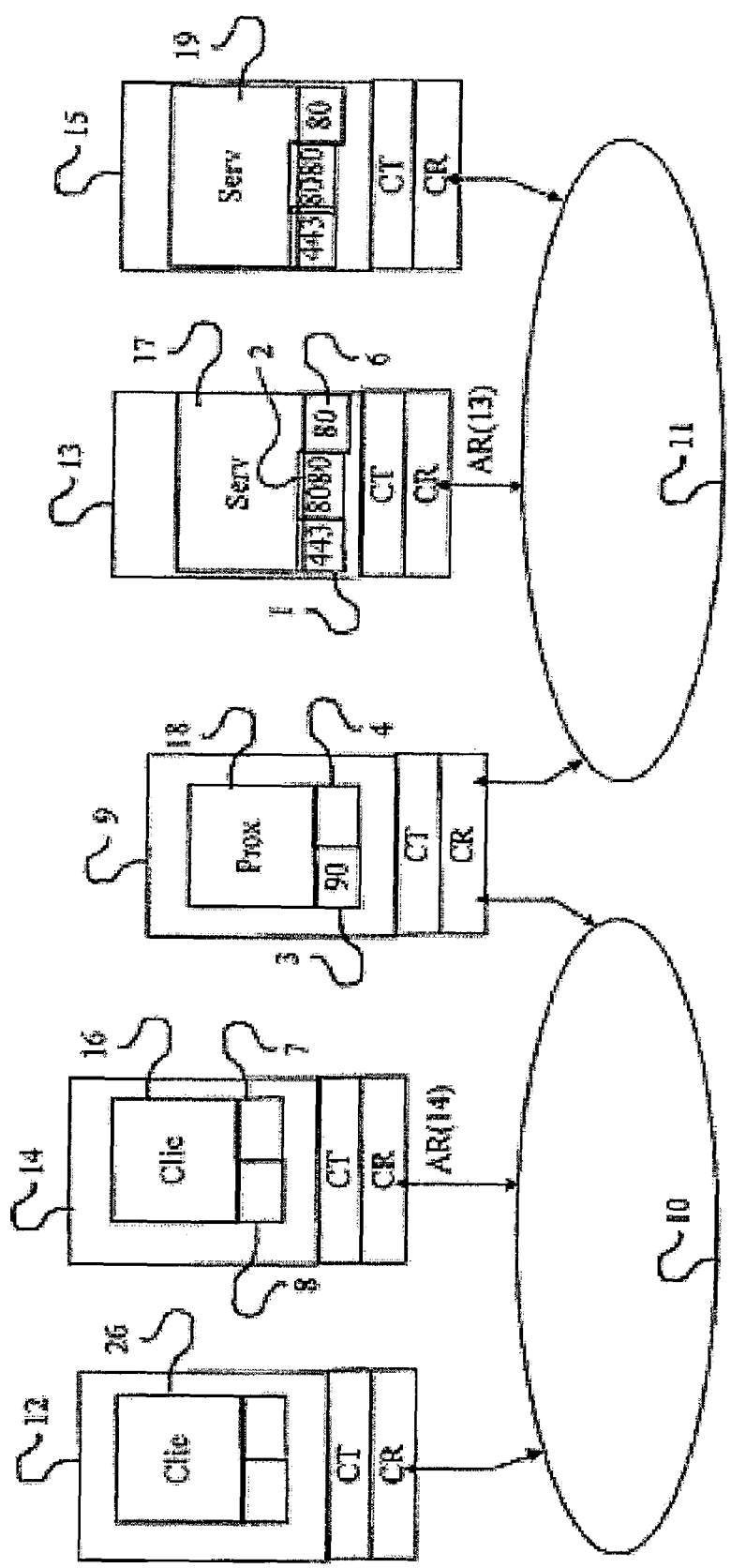
FIG. 1 represents a network architecture between client application and server application.

Referring to FIG. 1, a client machine 14 hosts one or more client applications 16. The client machine 14 is linked to a client network 10 in which it is recognized by a network address AR(14). A server machine 13 hosts one or more server applications 17. The server machine 13 is linked to a server network 11 in which it is recognized by a network address AR(13). A gateway machine 9 is linked to the client network 10 and to the server network 11. In a known way, each machine represented in FIG. 1 has a transport layer CT and a network layer CR for establishing connections between machines.

The client network 10 should be taken in its broadest sense, i.e., in the sense that it can be constituted in a known and varied fashion by a local network and a public network linked by one or more routers, the details of which are not represented in order not to overcomplicate the figure unnecessarily.

Figure 2:
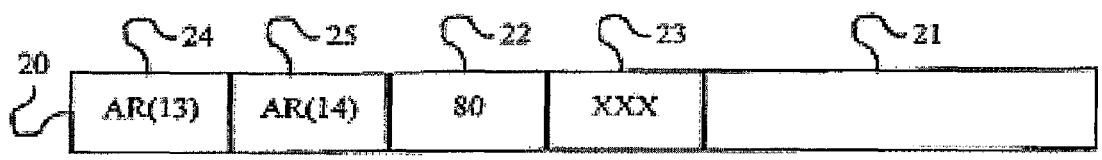
FIG. 2 represents messages exchanged between client application and non-secure server application.
Figure 2:
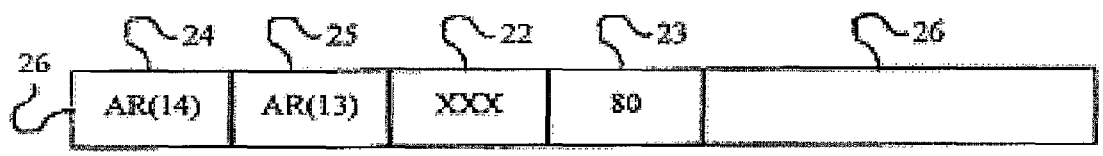

In a known way, referring to FIG. 2, such as for example with TCP/IP protocols on the Internet, the client application 16 requests to establish a non-secure connection with the server application 17 by generating a request 21 with a port number 6 of the server application 17 and the network address AR(13) of the machine 13. The request 21 is transmitted to the transport layer CT of the machine 14, which places in a destination field 22 of a message transport header 20 the port number 6, and in a sender field 23 a port number XXX allocated dynamically for the return. Only the value of the port number 6 needs to be known by the client application 16; it is for example the value 80 in the Internet world. The request is transmitted with the transport header from the transport layer CT to the network layer CR of the machine 14. The layer CR of the machine 14 places, in a destination field 24 of a network header, the network address AR(13) of the machine 13, and in a sender field 25, the network address AR(14) of the machine 14. The message 20 thus constituted is transmitted from the network layer CR of the machine 14 to the client network 10, which routes the message 20 to the network layer CR of the machine 9. The network layer CR of the machine 9 transfers the message 20 from the client network 10 to the server network 11, which routes the message 20 to the network layer CR of the machine 13. The message 20 moves from the network layer CR of the machine 13 up to the transport layer CT, which delivers the request 21 to the port 6 of the server application 17. The connection is established so as to allow the client 16 and server 17 applications to exchange messages through this connection. Thus, the server machine 13 can send a response message 26 such that the destination field 24 contains the address, AR(14), the sender field 25 contains the address AR(13), the destination field 22 contains the value XX of the dynamically allocated port, and the sender field 23 contains the number 80 of the port 6.

A secure connection is distinguished from a non-secure connection by a first port 1 of the server application 17. The number of the port 1 has, for example, the value 443 in the case of a secure browser application in the Internet world.

Figure 3:
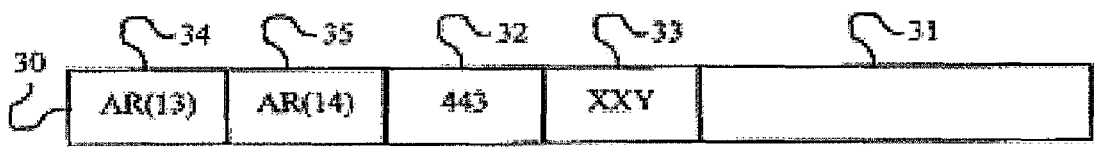
FIG. 3 represents messages exchanged between client application and secure server application, using the invention.
Figure 3:
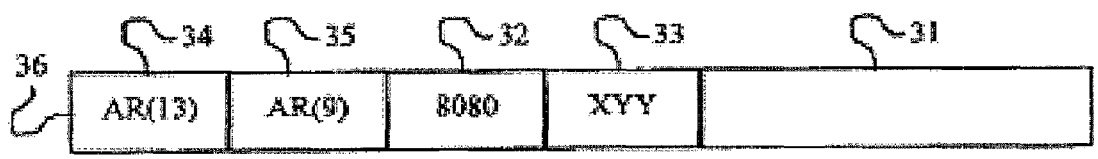

Referring to FIG. 3, a secure connection message 30 contains the number of the port 1 in the destination field 32 of its transport header.

When the message 30 is presented to the network layer CR of the machine 9, having come from the client network 10 for a connection with the server application 17, which is secure in the client network 10, the message 30 contains, in the destination field 34 of the network header, the network address AR(13) of the machine 13.

Figure 4:
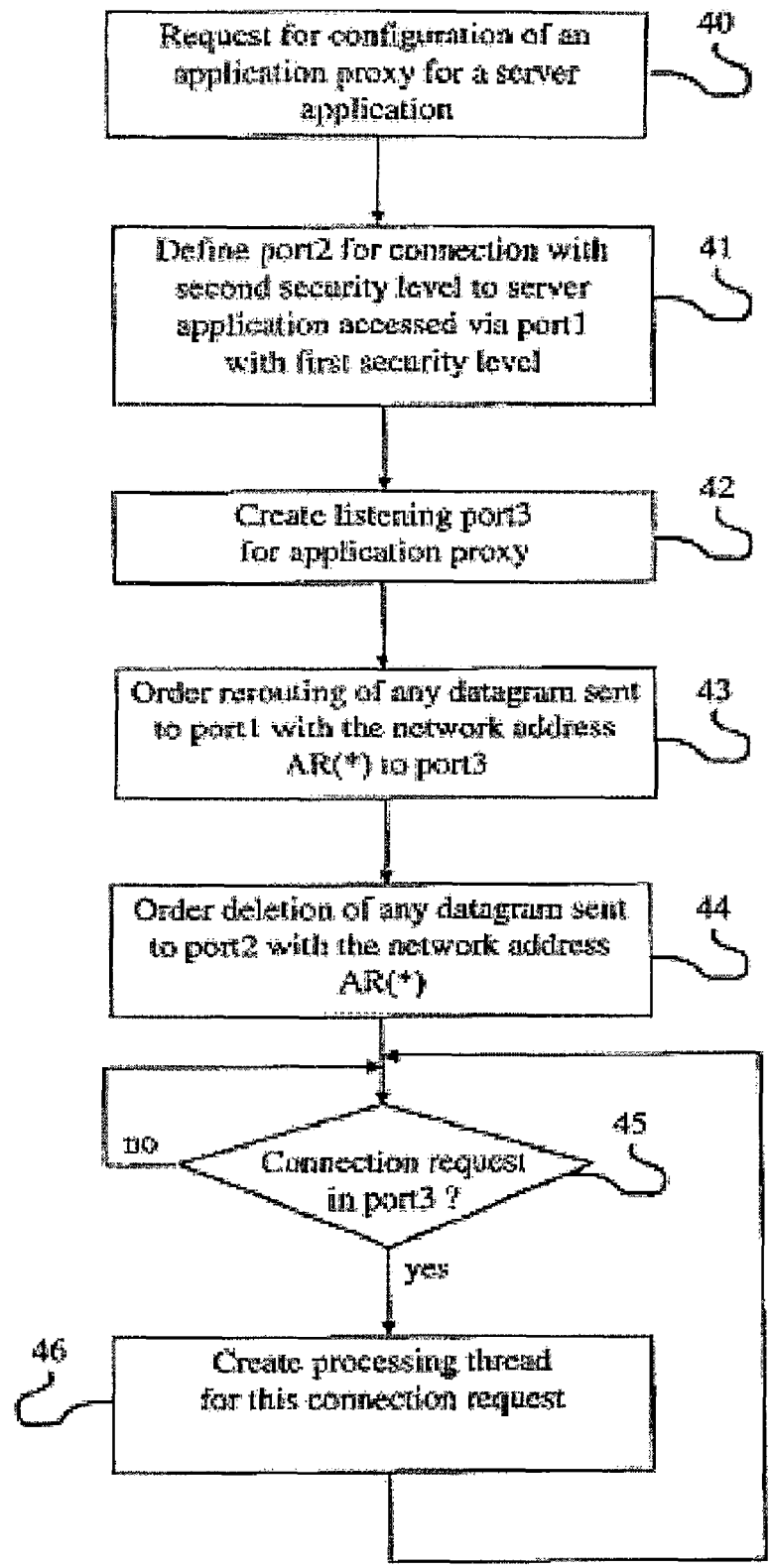
FIG. 4 represents the steps of a method according to the invention.

A method for allowing the client application 16 to establish a connection having a first security level is described in reference to FIG. 4. The first security level should be taken in its broadest sense; it can correspond to messages that are strongly encrypted when confidentiality is desired in the network 10 in the face of any intrusion, weakly encrypted if the consequences of an intrusion in the network 10 are minor, or even unencrypted if the confidentiality of the messages is under complete control due to the nature of the network 10, for example if the network 10 is private.

A first step 42 creates a port 3 in the gateway machine 9. As will be seen below, the port 3 is designed to listen for messages addressed to the server application 17. This means that for a connection with another server application 19, another listening port is created. The port 3 does not have to be known outside the gateway machine 9; it is created dynamically by simply requesting the operating system to allocate a communication port from among those available. This dynamic allocation offers the advantage of being able to define several ports, each associated with a different server application.

A fourth step 43 orders the network layer CR of the machine 9 to reroute to the port 3 any message sent to the port 1 that is addressed to the server machine 13. An operating system such as LINUX, for example, provides a command known as "ipchains-A input-j REDIRECT" that has as parameters a destination port, a destination network address and a reroute port. By giving these parameters, respectively, the value of the port 1, for example 443, the network address value AR(13) of the machine 1 and the value of the port 3, the network layer CR of the gateway machine 9 can identify any datagram of a message 30 having in its header the values of the first two parameters, and can thus reroute the message 30 in the machine 9 to the port whose value is that of the third parameter.

A third step 45 listens to the port 3. The detection of a connection request in the port 3 triggers a fourth step 46.

The fourth step 46 generates a processing thread for the connection request detected in step 45 in order to process the connection with a first security level, substituting it for the server application 17 of the/machine 13. This processing of the connection in the gateway machine 9 is transparent for the client machine 14, since the latter sends its messages to the server application 17 in the machine 13. The method then continues in step 45 so as to detect other connection requests coming from the machine 14 or from another client machine 12. This return to step 45 from step 46 makes it possible to generate a separate thread for each connection request.

The advantage of the steps of the method just described is that the first security level is limited to the client network 10. In order to allow the server application 17 to communicate with the client application 16 using a second security level in the server network 11, a fifth step 41 defines a port 2 of the server application 17. This port 2 is designed to receive connections with the second security level, through functionalities of the server application that are normally accessible with the first security level. These functionalities are generally distinct from normally accessible functionalities, for example in the port 6.

Figure 5:
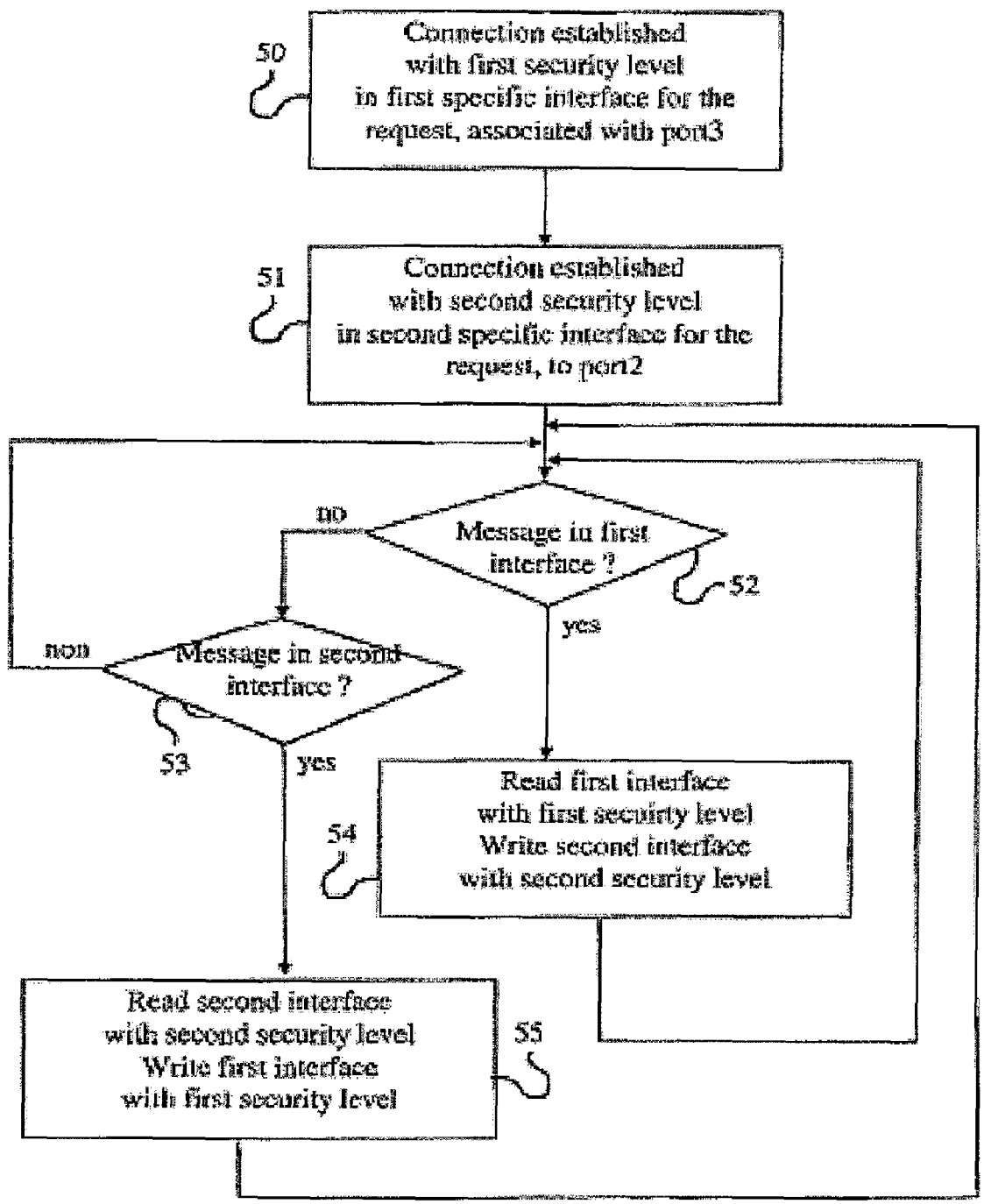
FIG. 5 represents the phases of a thread according to the invention.
Figure 6:
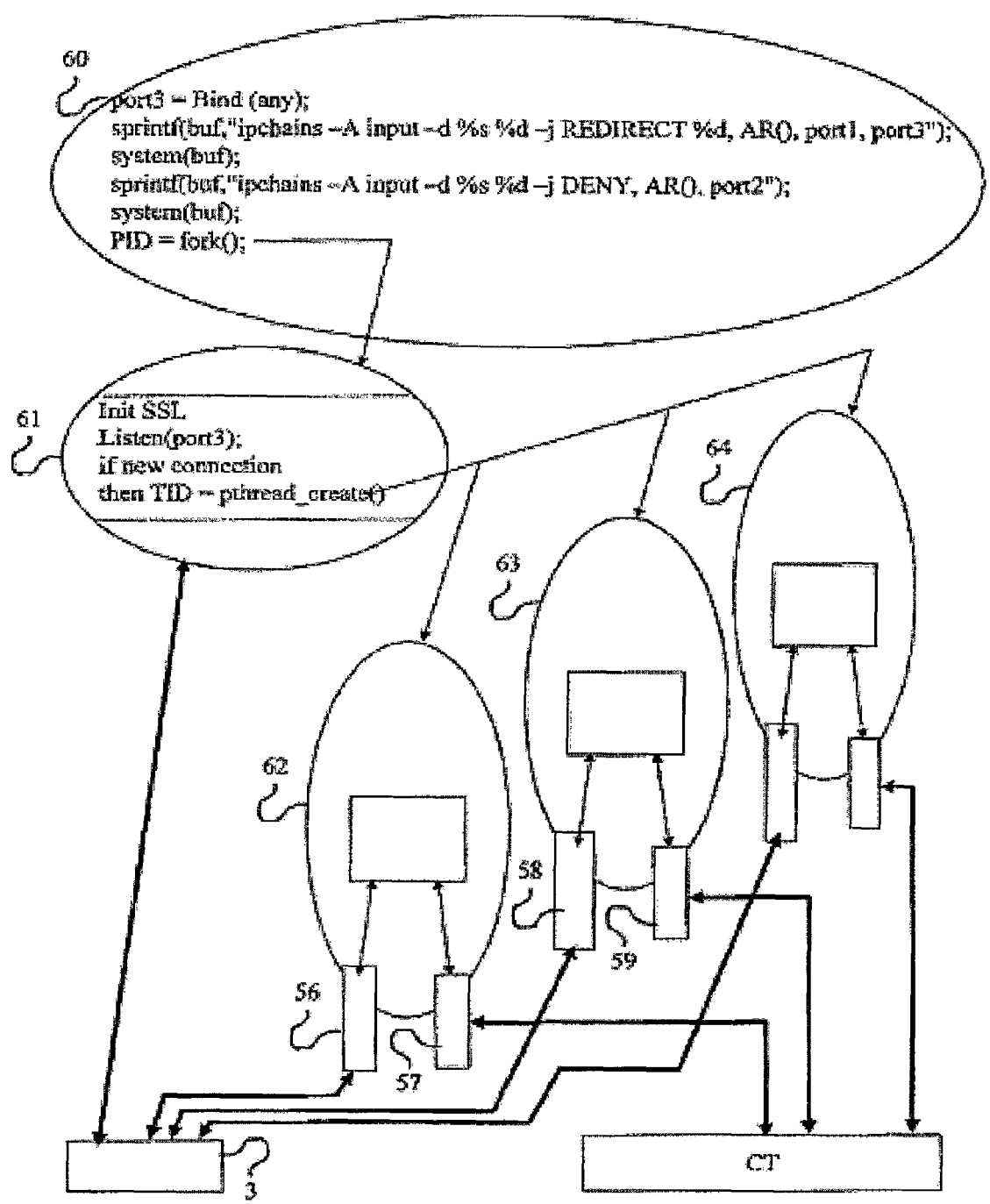
FIG. 6 represents the processes executed by a secure application proxy according to the invention.

Various phases of the implementation of the thread generated in step 46 are described in reference to FIG. 5.

A first phase 50 establishes the connection with the first security level. To do this, a first communication interface 56 is opened in the port 3. In the case of the LINUX operating system this interface is known as a "socket." Thus, each thread, and consequently each connection with the first security level, has its own communication interface. Next, a protocol for negotiating a connection with the first security level is engaged in this first interface. Depending on the degree of the first security level, the purpose of this protocol is to exchange identification and cryptographic certificates between senders and receivers. A non-limiting example is a known protocol such as SSL.

The connection established in phase 50 is represented in FIG. 5 by a phase 52, which listens to the first interface 56 in order to detect any message entering into it.

A second phase 51 establishes a connection with a second security level. To do this, a second communication interface to the port 2 of the server machine 13 is opened. In the case of the LINUX operating system, this interface is known as a "socket." Thus, each thread has its own second communication interface with the server application 17. If, for example, the second security level is zero, the connection occurs in a conventional way, as in any non-secure connection.

The connection established in phase 51 is represented in FIG. 5 by a phase 53, which listens to the second interface 56 in order to detect any message entering into it.

The detection of a message entering in phase 52 activates a phase 54. The first interface is read with the first security level, which means that the read instruction is a function of the first security level that uses any encryption keys associated with this security level to decrypt the message if it is encrypted. The message thus read is written with the second security level, in the second interface. Just like the read instruction, the write instruction is a function of the second security level. If the second security level is zero, the write instruction is a conventional instruction. If encryption keys are associated with the second security level, the write instruction uses them to encrypt the message.

The detection of a message entering in phase 53 activates a phase 55. The second interface is read with the second security level, which means that the read instruction is a function of the second security level, which uses any encryption keys associated with this security level to decrypt the message if it is encrypted., The message thus read is written with the first security level, in the first interface. Like the read instruction, the write instruction is a function of the first security level. If the first security level is zero, the write instruction is a conventional instruction. If encryption keys are associated with the first security level, the write instruction uses them to encrypt the message.

Thus, the thread transfers the messages from the network 10 to the network 11 and from the network 11 to the network 10 so that the connection with the first security level is seen in the network 10 as an end-to-end connection between the client machine and the server machine, without the client application's having to be concerned with the intermediate processing in the gateway machine 9.

In order to prevent the functionalities of the server application that are normally accessible through the port 1 from being accessed by a non-secure connection in the port 2, a sixth step 44 orders the network layer CR of the machine 9 to delete any message sent to the port 2 that is addressed to the server machine 13. An operating system like LINUX, for example, provides a command known as "ipchains-A input-j DENY", which has as parameters a destination port and a destination network address. By giving these parameters, respectively, the value of the port 2, for example 8080, and the network address value AR(13) of the machine 13, the network layer CR of the gateway machine 9 can identify any datagram of a message having in its header the values of the first two parameters, and thus delete this message.

In order to automatically implement the method described above, the gateway machine 9 hosts a secure application proxy 18. A user orders an instruction for configuring the secure application proxy 18 for each server application 17, 19 for which it requires a second security level in the server network 11. The configuration instruction has as parameters the network address of the server machine, the port number normally accessed with the first security level, and the number of the port defined so as to be accessed with the second security level. In the case of the server application 17 hosted in the server machine 13, the parameters have, for example, the values AR(13), 443, and 8080.

Each call of the configuration instruction starts a first process 60 in the gateway machine 9 that executes the first step 42 and the second step 43. The second port 3 is created by means of a programmed instruction Bind(any). The rerouting is ordered by means of a first system call system(buf), where buf is a buffer value determined by a first instruction sprintf. The first instruction sprintf gives as the value buf a character string "ipchains-A input-d $V_1V_2$-j REDIRECT $V_3$" where respectively, the variable $V_1$ is replaced by the network address given as a parameter, $V_2$ is replaced by the value of the port 1 and $V_3$ is replaced by the value of the dynamic port 3. An instruction fork( ) then generates a second process 61. In a known way, the instruction fork( ) creates the second process by duplicating the first process with an inheritance of its memory when the instruction is executed.

Advantageously, the first process 60 also executes the sixth step 44. The deletion is ordered by a second system call system(buf), where buf is a buffer value determined by a second instruction sprintf. The second instruction sprintf gives as the value buf a character string "ipchains-A input-d $V_1V_2$-j DENY" where, respectively, the variable $V_1$ is replaced by the network address given as a parameter, and $V_2$ is replaced by the value of the port 2.

The second process executes the third step 45 and the fourth step 46. An instruction Listen(port3) sets the process to listen to the second port 3, created dynamically by the first process. The protocol of the first security level is initialized, for example SSL. Upon the detection of a new connection to the second port 3, an instruction pthread_create( ) generates a thread for the connection detected.

In the second process, each detection of a new connection generates a new thread 62, 63, 64. The advantage of threads is that they share all the memory of the second process. Thus, when a connection is closed, the thread disappears but values such as the values for negotiating the connection remain present in the memory of the second process and can be reused for another connection involving the same ends users, a client application and a server application. Each thread executes the phases 50 through 55 described above. The thread 62 generates and uses the communication interface 56 in the port 3 and the communication interface 57 with the transport layer CT of the machine 9 to pass the messages from the interface 56 to the interface 57 and vice versa, adapting the security level to the connection to the network 10 and to the connection to the network 11. When the thread 62 receives in the interface 56 the body 31 of the message 30 with the first security level, it applies the second security level to the body 31 of the message 30 in order to retransmit it to the network layer CR of the machine 9 through the interface 57, so that the network layer CR generates the message 36 to be sent to the server machine whose address is contained in the field 34 and to the port whose number is contained in the field 32 of the message 36. Likewise, the thread 63 generates and uses the communication interface 58 in the port 3 and the communication interface 59 with the transport layer CT of the machine 9 in order to pass the messages from the interface 58 to the interface 59 and vice versa, adapting the security level to the connection to the network 10 and to the connection to the network 11.

Since there is a process for each server application for which the secure application proxy 18 has been configured, there is a second process for each of these server applications. The advantage of generating the second process by means of the first process is to avoid having to reconfigure the application proxy 18 if the second process is blocked, for example due to a connection overload. The first process monitors the second process, in a known way by means of signals, so as to restart the second process in case of a fault.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the true spirit and full scope of the invention as set forth herein and defined in the claims.

The invention claimed is:

1. A method allowing a client application running on a client machine linked to a client network to establish communication, with a server application hosted in a server machine linked to a server network, in order to exchange messages with the server application, said messages passing between the client network and the server network through a network layer of a gateway machine, the method comprising:
  A) receiving a request from the client application running on the client machine to establish communication at a first security level of encryption to the server machine;
  B) in response to the request, creating a first port in the gateway machine;
  C) also in response to the request, creating one or more first created processes on the gateway machine;
  D) the gateway machine establishing a first connection from the client application to the first port on the gateway machine, the first connection connecting the client machine to the gateway machine for the exchange of messages at the first security level of encryption;
  E) creating a second port in the gateway machine;
  F) the gateway machine establishing a second connection from the second port of the gateway machine to the server machine, the second connection to be used to exchange messages at a second security level of encryption which is reduced from the first security level of encryption; and,
  G) the gateway machine receiving, on the first port, a plurality of messages received at the first security level of encryption from the client machine and linked client network;
  H) the gateway machine performing, with at least one of the first created processes, security processing, the security processing reducing the level of encryption of the plurality of the messages received from the client machine from the first security level of encryption to the second security level of encryption;
  I) after performing the security processing to reduce the level of encryption of the plurality of messages, the gateway machine sending, at the second security level of encryption, to the second port those messages sent from the client machine at the first security level of encryption and addressed to the server machine;
  J) routing through the gateway machine messages received by the gateway machine from the server machine that are addressed to the client application on the client machine, and sending those messages to the client application on the first port of the gateway machine; and,
  K) the gateway machine first created processes handling security processing at the first security level of encryption for said messages sent and said messages received on the first port of the gateway machine over the first connection, thereby removing from the server machine, security processing at the first security level of encryption for these messages, and reducing load in terms of computing resources for encryption operations on the server machine.

2. A method according to claim 1, wherein steps D, E, and F are executed automatically by the first created processes of the gateway machine, and wherein said first created processes generates one or more second created processes that execute steps G and H.

3. A method according to claim 1, further comprising deleting, by ordering the network layer of the gateway machine, messages sent from the client network to a port other than the first port located in the server machine.

4. A method as claimed in claim 1, wherein the rerouting of the messages addressed to the first port of the server application is done in a way that is transparent to the client application.

5. The method according to claim 1, wherein the second security level of encryption provides for exchange of messages which are unencrypted.

6. The method according to claim 1, wherein the second security level of encryption is at a greater security level than a security level of no encryption.

* * * * *